Figure 1:
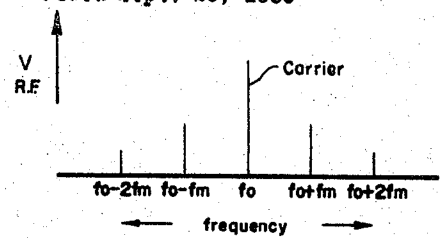

FIP8102 XR 3,071,726

CROSS REFERENCE

SEARCH ROOM

Tx5274P

Jan. 1, 1963 B. E. NELSON 3,071,726

FREQUENCY MODULATION MEASUREMENT METHOD AND APPARATUS

Filed Sept. 29, 1959 3 Sheets-Sheet 1

INVENTOR.
Bruce E. Nelson
BY Harry E. Aine
Attorney

FREQUENCY MODULATION MEASUREMENT METHOD AND APPARATUS
Filed Sept. 29, 1959 3 Sheets-Sheet 2
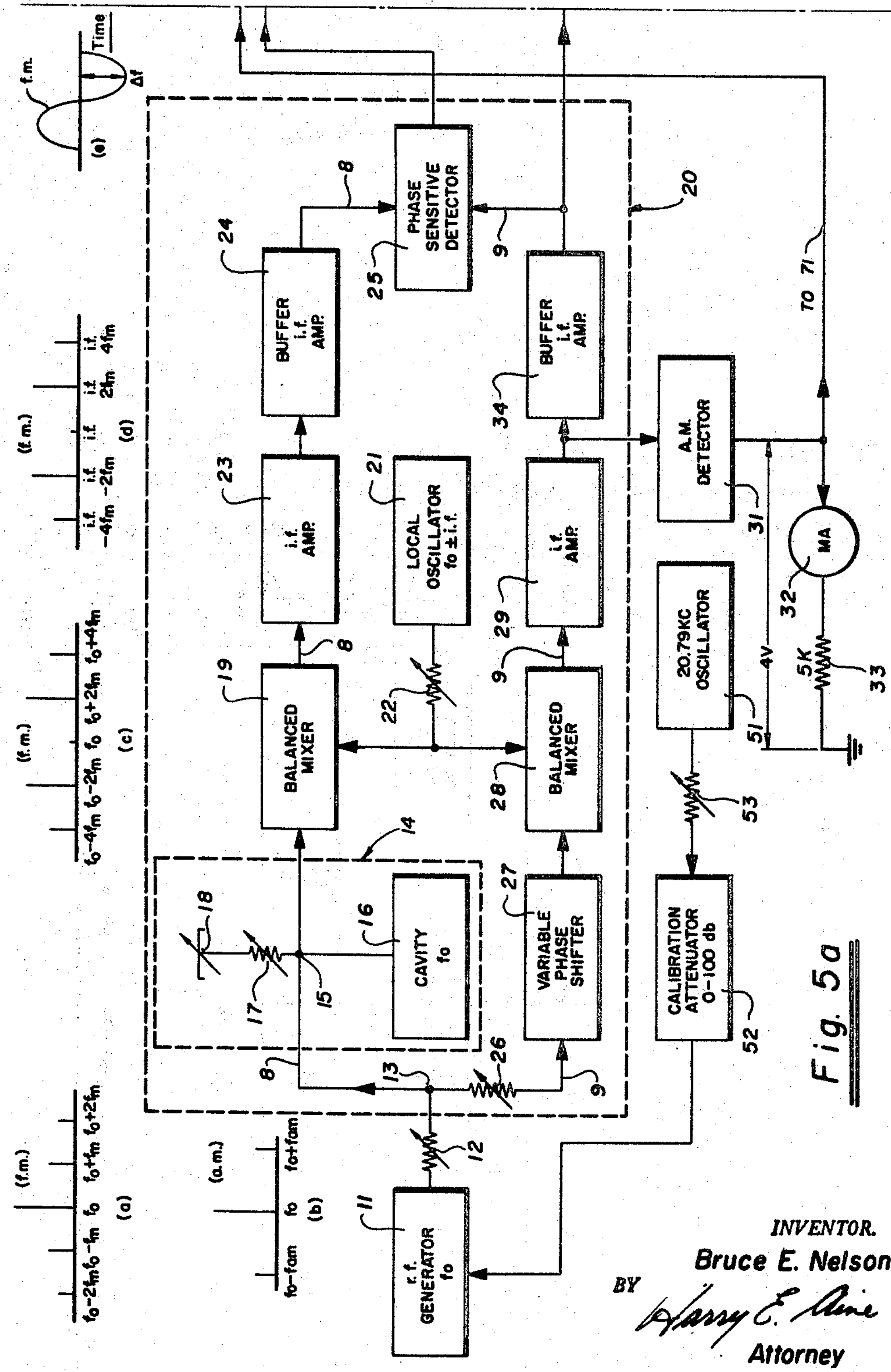
INVENTOR.
Bruce E. Nelson
BY Harry E. Aine
Attorney Jan. 1, 1963 B. E. NELSON 3,071,726
FREQUENCY MODULATION MEASUREMENT METHOD AND APPARATUS
Filed Sept. 29, 1959 3 Sheets-Sheet 3
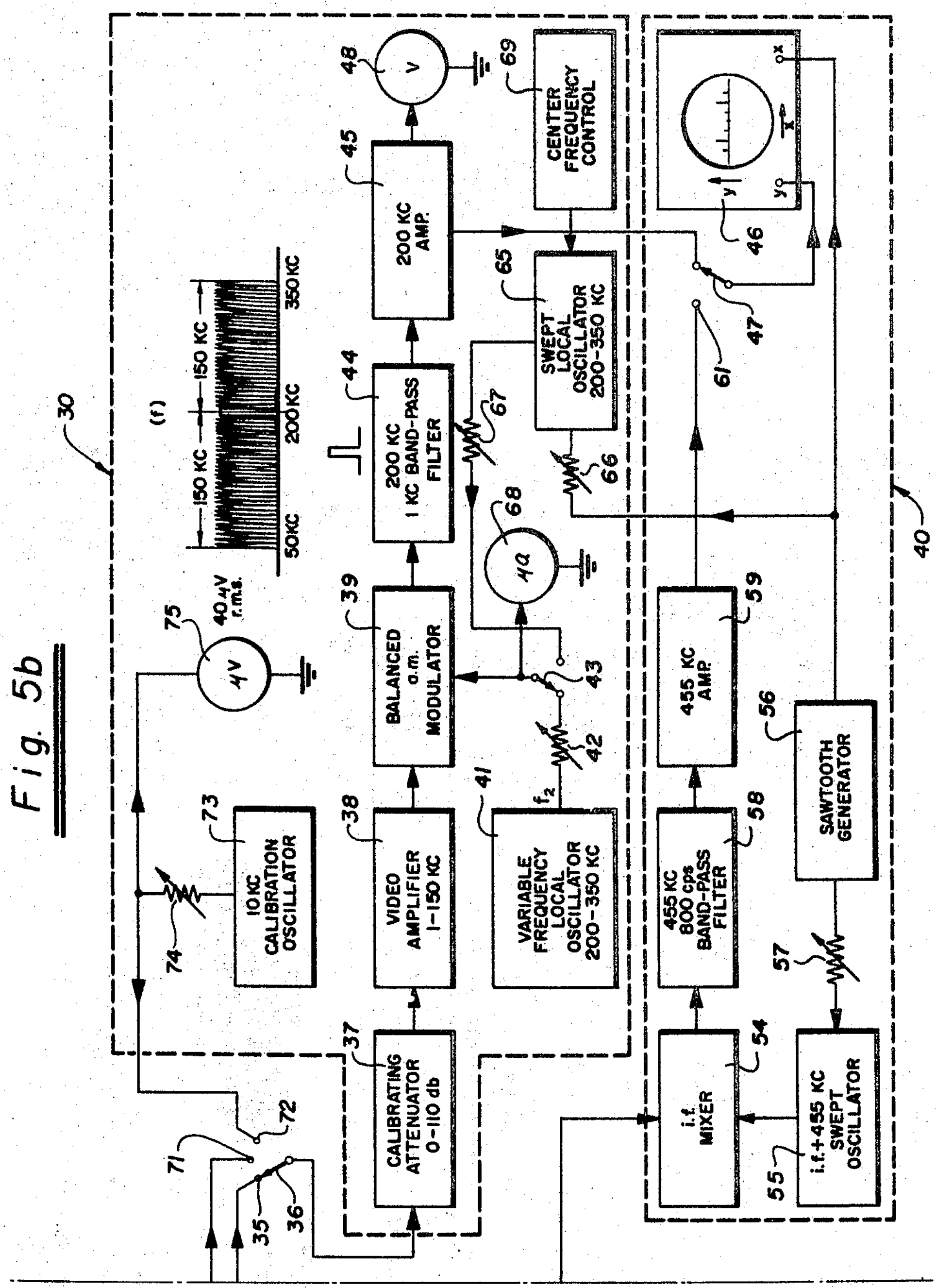
INVENTOR.
Bruce E. Nelson
BY Harry E. Aine
Attorney United States Patent Office 3,071,726

Patented Jan. 1, 1963

3,071,726

FREQUENCY MODULATION MEASUREMENT METHOD AND APPARATUS

Bruce E. Nelson, Los Altos, Calif., assignor to Varian Associates, Palo Alto, Calif., a corporation of California Filed Sept. 29, 1959, Ser. No. 843,081
9 Claims. (Cl. 324—79)

The present invention relates in general to frequency modulation measurement and more particularly to novel method and apparatus for accurately measuring the frequency deviation of frequency modulated radio frequency generators. The features of the present invention are especially useful for precisely calibrating the frequency deviation of F.M. generators, for obtaining extremely accurate measurements of F.M. noise, and for accurately measuring F.M. modulation sensitivity.

The calibration and adjustment of F.M. generators to provide for a very accurately controlled peak frequency deviation is a serious problem in certain applications such as, for example, F.M. broadcast stations. In addition, there is a growing need for a very precise peak frequency deviation monitor and measuring apparatus for use in analyzing the performance of certain C.W. Doppler radar systems. Certain of the above applications require apparatus for measuring the peak frequency deviation to 0.05 cycle per second.

Heretofore F.M. monitors have been built having an accuracy of 5% to 10% in the measurement of frequency deviation. Furthermore, these instruments were generally limited to the measurement of frequency deviations of signals having rather low modulating frequencies such as a few kilocycles. These instruments are practically useless if the application requires accuracy in the measurement of frequency deviations to 1% when the modulating frequency is higher than 20 kilocycles.

The present invention is particularly useful, but not limited to, measuring the frequency deviation in R.F. generators where the change of frequency with applied modulating voltage, i.e., modulation sensitivity, is independent of the modulating frequency for modulating frequencies of several megacycles per second and the modulation sensitivity is constant over rather wide limits. Examples of such R.F. generating devices include, reflex klystrons, backward wave oscillators, and voltage tunable magnetrons.

The F.M. frequency deviation measuring feature of the present invention is based upon the physical principle of the carrier null mechanism. More specifically, the carrier null mechanism has reference to the fact that the R.F. carrier voltage amplitude goes to zero when the frequency modulation index $M_f$ equals 2.405. This particular level of modulation is commonly called the first carrier null condition. By employing a spectrum analyzer, the carrier output of the R.F. generator under measurement can be observed. The amplitude of the modulating signal of known frequency F.M. is increased from zero amplitude until the carrier shrinks to zero amplitude thereby making the modulation index $M_f$ equal to 2.405.

The modulation index $M_f$ is defined as follows:

$$M_f=\frac{\Delta f}{f_m} \quad (1)$$

where $\Delta f$ is the peak frequency deviation; and $f_m$ is the modulation frequency. Thus, at the carrier null condition:

$$\frac{\Delta f}{f_m}=2.405 \quad (2)$$

and since $f_m$ is known, $\Delta f$ is uniquely determined and easily calculated from Equation 2.

By measuring the amplitude $V_m$ of the modulating signal $f_m$ at the carrier null condition the modulation sensitivity $$\frac{\Delta f}{V_m}$$

of the R.F. generator is determined. If the modulation sensitivity is constant other desired peak frequency deviations may be set up on the generator by merely setting the amplitude $V_m$ of the modulating signal to the proper amplitude. Moreover, by comparing the amplitude $V_m$ of a known first reference modulating signal with the amplitude $V_m$ of a second modulating signal the peak frequency deviation of the second modulating signal may be readily determined.

The principal object of the present invention is to provide a novel relatively simple highly accurate method and apparatus for measuring and calibrating the frequency deviation of frequency modulated radio frequency generators.

One feature of the present invention is the provision of method and apparatus for intentionally frequency modulating the R.F. generator under measurement with a signal of known frequency $f_m$ while increasing the magnitude $V_m$ of the known signal and monitoring the carrier until the carrier goes to a null condition at which time the peak frequency deviation $\Delta f$ is uniquely determined for that particular modulating frequency $f_m$.

Another feature of the present invention is the provision of novel method and apparatus for ascertaining the modulating sensitivity of a given R.F. generator including the provision of the preceding feature plus the provision of measuring the amplitude $V_m$ of the modulating signal applied to the R.F. generator at the carrier null condition whereby the modulation sensitivity is determined by the ratio of the peak frequency deviation $\Delta f$ to the modulation signal amplitude $V_m$.

Another feature of the present invention is the provision of method and apparatus for setting or calibrating any desired peak frequency deviation by utilizing the provisions of the immediately preceding feature plus setting or determining the proper ratio, as determined by the modulation sensitivity, between a known reference modulating signal amplitude and a second desired modulating signal amplitude.

Another feature of the present invention is the same as the preceding feature wherein the ratio of amplitude $V_m$ of the first reference and second desired modulation signals is accurately determined through the use of a precisely calibrated attenuator whereby very small peak frequency deviations may be accurately monitored or obtained.

Another feature of the present invention is the provision of a F.M. noise measuring equipment including one or more of the above features for precisely determining the F.M. noise components in a signal under measurement.

Another feature of the present invention is a F.M. deviation measuring equipment having the provisions of the immediately preceding feature and including the step of comparing the amplitude of F.M. deviations within a certain narrow bandwidth removed from the carrier with the amplitude of a reference F.M. deviation signal which is intentionally produced whereby the frequency deviation of the F.M. noise or discrete frequency modulation may be precisely determined.

Figure 2:
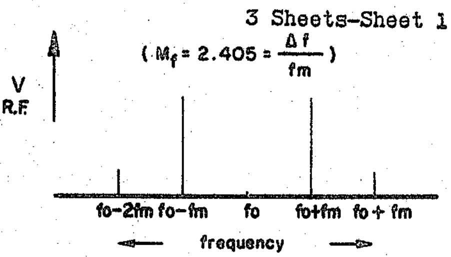
Figure 3:
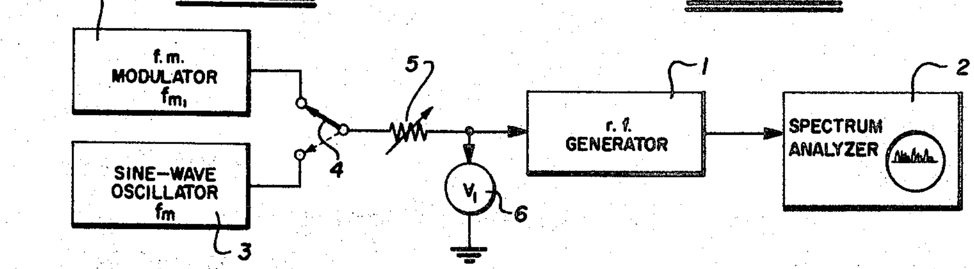
Figure 4:
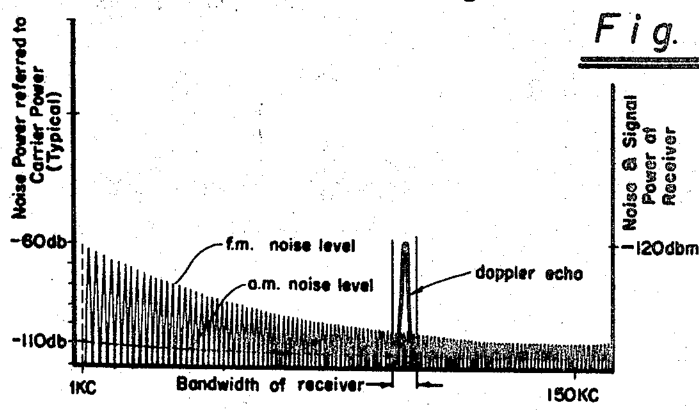
Figure 6:
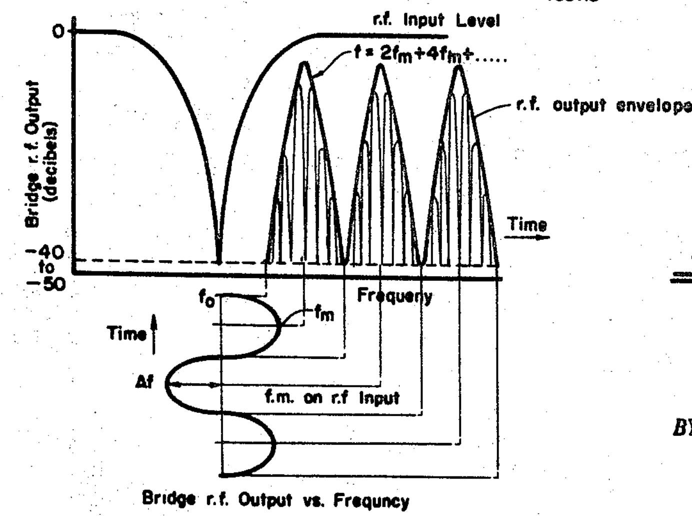

Other features and advantages of the present invention will become apparent upon a perusal of the following specification taken in connection with the accompanying drawings wherein, FIG. 1 is a graph showing the partial frequency spectrum of a frequency modulated carrier, FIG. 2 is a graph showing the partial frequency spectrum for a frequency modulated carrier wherein the modulation index is adjusted for the first carrier null condition, FIG. 3 is a schematic block diagram of a circuit including features of the present invention, FIG. 4 is a graph of transmitter to receiver leakage R.F. power in db versus frequency depicting a carrier and F.M. and A.M. noise power in one sideband thereof, FIG. *5a* is the first half of a schematic block diagram of an electrical noise measuring circuit utilizing features of the present invention, FIG. *5b* is the second half of a schematic block diagram of an electrical noise measuring circuit utilizing features of the present invention, and FIG. 6 is a diagram of the R.F. characteristics of an R.F. frequency discriminating bridge network utilized in the circuit of FIG. 5.

The theory of the carrier null method for measuring frequency deviation will first be described followed by a description of certain relatively simple apparatus for performing frequency deviation measurements utilizing the carrier null method. A noise measuring equipment incorporating the novel F.M. noise calibrating features of the present invention will then be described.

Referring now to FIG. 1 there is shown the partial frequency spectrum for a carrier wave being modulated in frequency for a certain peak deviation $\Delta f$ at a certain modulating frequency $f_m$ and the modulation index being less than 2.405. From FIG. 1 it can be seen that in such a case there will be found a carrier signal at $f_0$, the carrier frequency, and upper and lower sideband signals appearing at integer multiples of $f_m$. The sideband amplitudes vary with the peak frequency deviation for a certain modulation frequency $f_m$.

The carrier amplitude varies as a zero order Bessel function of the modulation index $M_f$ where the modulation index is defined above in Equation 1. The important point of Equation 1 is that the carrier voltage amplitude goes to zero when the modulation index $M_f$ equals 2.405. This particular level of modulation is commonly called the first carrier null condition. The present invention is based upon the physical principle of the carrier null mechanism. The carrier null condition is depicted in FIG. 2 of the drawings.

The carrier null condition may be detected with great accuracy by displaying the spectrum of the output of the R.F. generator on the oscilloscope of a spectrum analyzer and observing the amplitude of the carrier while changing the modulation index. If the modulation index is started at something approaching zero and increased steadily until the first carrier null is observed, it will be known that this carrier null is the first carrier null and that $M_f$ is equal to 2.405. At the first carrier null condition either the peak deviation $\Delta f$ or the modulating frequency $f_m$ is uniquely determined if either one of these quantities is known.

The peak frequency deviation may be very accurately measured utilizing the carrier null technique if the modulating frequency $f_m$ is precisely known. Since it is relatively easy to know and precisely control the modulation frequency, the peak deviation is determinable to a high degree of accuracy utilizing the carrier null technique.

Referring now to FIG. 3 the carrier null method will be explained as it is utilized for measuring the frequency deviation of an R.F. generator. Method and apparatus will also be described in FIG. 3 for determining the modulation sensitivity of the R.F. generator and for calibrating the frequency deviation of the R.F. generator. In particular, an R.F. generator 1, the F.M. properties of which it is desired to measure, has its output signal coupled to the input of a spectrum analyzer 2 for displaying the R.F. carrier and sidebands. The R.F. generator 1 is preferably of the type having an R.F. output frequency which is a linear function of the modulating voltage, i.e., a constant modulating sensitivity such as, for example, klystron oscillators, backward wave oscillators, or voltage tunable magnetrons.

*Method and Apparatus for Measuring Modulation Sensitivity*

$$\frac{\Delta f}{V}$$

A sine wave oscillator 3, the frequency of which can be precisely controlled or known, has its output signal coupled to the modulating electrode of the R.F. generator 1 via the intermediary of a switch 4 and variable attenuator 5. The amplitude $V_m$ of the modulating signal $f_m$ applied to the modulating electrode of the R.F. generator 1 is measured via the intermediary of a voltmeter 6. connected between the modulating electrode of the R.F. generator 1 and ground. Starting from a very low amplitude of modulating voltage $V_m$, the amplitude of the modulating voltage $V_m$ applied to the R.F. generator 1 is increased by decreasing the resistance of the attenuator 5. Meanwhile, the spectrum analyzer 2 is observed until the R.F. carrier amplitude shrinks to zero with increasing $V_m$ thereby indicating the first carrier null condition. Excellent accuracy is possible in making the modulation sensitivity measurement because the carrier null indication on the oscilloscope of the spectrum analyzer 2 is very easy to determine with extreme accuracy. The amplitude of the modulating voltage $V_m$ at carrier null is read from the voltmeter 6 and with this measurement the modulation sensitivity of the R.F. generator may be readily computed as follows: Assume $V_m$ is 10 volts peak at carrier null and the modulation frequency $f_m$ is 8,316 cycles per second.

From Equation 1, $$\Delta f = f_m 2.405 = 8{,}316(2.405) = 20{,}000 \text{ c.p.s.}$$

Modulation sensitivity is:

$$\frac{\Delta f}{V_m} = \frac{20{,}000}{10} = 2{,}000 \text{ c.p.s./volt}$$

*Method and Apparatus for Setting Up a Certain Frequency Deviation*

A certain peak frequency deviation as of, for example, 20,000 cycles per second may be readily set up at a modulation frequency different than the sine wave oscillator frequency as of, for example, 500,000 cycles per second once the modulation sensitivity has been accurately measured as by, for example, the above method. More specifically, from the previous example 10 volts peak modulating voltage $V_m$ will yield a peak deviation of 20,000 cycles per second in the output of the R.F. generator 1. Therefore, the second F.M. modulator 7 is connected to the modulating electrode of the R.F. generator 1 through the intermediary of switch 4 and variable attenuator 5. The attenuator 5 is varied until 10 volts peak modulating voltage $V_m$ is read from meter 6 at the new modulating frequency $f_m$ of 500,000 c.p.s. It is then known that the R.F. generator 1 is set for the certain predetermined 20,000 c.p.s. peak frequency deviation at a modulating frequency $f_m$ of 500,000 c.p.s.

Any desired peak deviation may also be obtained by finding the modulation sensitivity as taught above and simply computing the new peak modulating voltage $V_m$ required to produce the desired peak frequency deviation $\Delta f$ by means of a simple proportion computation. The accuracy of the peak deviation $\Delta f$ set up in this manner is limited only by the accuracy and frequency response of the peak voltmeter 6, assuming a constant modulation sensitivity.

Very large or very small peak deviations are preferably set up by using a precisely calibrated variable attenuator 5 to control the modulating voltage level. This technique is particularly useful when very small frequency deviations are desired as of, for example, 0.1 cycle per second. Setting up of very small frequency deviations is especially useful when calibrating F.M. noise measuring equipment. As an example of setting up a small frequency deviation, suppose it is desired to establish a peak frequency deviation of 2 cycles per second with the generator having a modulation sensitivity of 2,000 c.p.s. per volt. The modulating voltage $V_m$ required to produce 2 cycles per second peak deviation is found, by a simple proportion computation, as 1 millivolt.

It may be difficult to obtain a voltmeter 6 which will accurately read over the range of 1 millivolt to 10 volts, and therefore a precisely calibrated variable attenuator 5 may be merely adjusted to insert 80 db of attenuation in the modulating signal which without the attenuation registered 10 volts on the voltmeter 6. In this manner the modulating voltage is readily reduced to 1 millivolt the amount required for 2 cycles per second in this particular example. The accuracy of utilizing the precision attenuator for setting up very small peak deviations is merely a function of the accuracy of the precision attenuator 5 and the constancy of the modulation sensitivity of the R.F. generator 1. It has been found that commercially available precision attenuators 5 have the desired linearity over many decades of attenuation, and that many voltage-tunable oscillators such as klystrons, backward wave oscillators, and voltage-tunable magnetrons have the desired constancy of modulation sensitivity over many decades of frequency deviation.

*Method and Apparatus for Calibrating F.M. Noise Measuring Equipment*

Referring now to FIG. 5 there is shown in schematic block diagram form an R.F. noise measuring equipment utilizing features of the present invention for calibrating the F.M. noise components of an R.F. generator under test. More specifically, an R.F. generator 11 as of, for example, a reflex klystron oscillator, backward wave oscillator, or voltage-tunable magnetron having F.M. and A.M. modulation thereon as indicated in spectrum (*a*) and (*b*), respectively, has the output microwave energy thereof coupled via a variable attenuator 12 to a waveguide tee 13. The F.M. and A.M. modulations shown are for discrete modulating frequencies giving discrete sideband lines. However, it should be understood that these modulations might just as well be composed of noise rather than discrete lines. Discrete modulations are shown to simplify the explanation of the mechanisms involved.

In the waveguide tee 13 the R.F. output energy of the generator 11 is split into two portions and one portion propagated through a first F.M. signal branch 8 and the other signal portion passed through a second reference branch 9 of an F.M. detecting network 20.

In the F.M. signal branch 8 of the F.M. detecting network 20 the R.F. output energy is fed to the input of a frequency discriminating R.F. bridge 14. The R.F. bridge 14 is tuned for a null condition at the same frequency $f_0$ as the carrier of the R.F. generator 11 such that when the frequency of the R.F. generator 11 is at the same frequency as the bridge 14 the output R.F. energy of the bridge will be very small. However, the bridge 14 is very sharply tuned such that small frequency deviations of the input R.F. energy from the frequency of the bridge $f_0$ will appear as an output signal. The function of the frequency discriminating bridge 14 is to transform frequency modulated R.F. energy, in the output signal of the R.F. generator 11, into amplitude modulated R.F. energy in the output of the bridge 14.

The frequency discriminating bridge 14 (see FIGS. 6 and 6) comprises a hybrid tee 15 having a tunable reaction cavity 16 coupled to one arm thereof, and tuned for a resonance at $f_0$. Another arm of the bridge includes a variable attenuator 17 and adjustable short 18. The other terminal of the hybrid tee 15 forms the output port thereof. The bridge 14 is balanced at the signal frequency $f_0$ by tuning the cavity 16 to resonance at $f_0$ and then adjusting the phase and amplitude of the reflected power from the opposite arm of the hybrid tee 15 via the attenuator 17 and adjustable short 18 to cancel any reflected power from the cavity 16 at resonance frequency $f_0$.

The R.F. performance of the frequency discriminating bridge 14 is shown in FIG. 6, which is a plot of the R.F. output level from the bridge as a function of the frequency of the R.F. input signal to the bridge 14. It is noted that the R.F. output level from the bridge, at a resonant frequency $f_0$, is 40 to 50 decibels below the R.F. input level to the bridge. At frequencies above and below the resonant frequency $f_0$ the R.F. output level from the bridge increases linearly over a considerable range of frequencies. For the example shown the R.F. input signal is frequency modulated at a discrete modulation frequency $f_m$ to a peak frequency deviation $\Delta f$, corresponding to spectrum (*a*) of FIG. 5. During those instants of time when the R.F. input signal to the bridge is equal to the resonant frequency of the bridge, $f_0$, the R.F. output signal is very small. As the frequency of the R.F. input signal increases and becomes higher than $f_0$ the amplitude of the R.F. output signal increases, returning again to a very low value as the frequency of the R.F. input signal returns to $f_0$. The same cycle occurs as the frequency of the R.F. input signal to the bridge proceeds below the resonant frequency $f_0$, and again the amplitude of the R.F. output signal from the bridge increases, returning again to a very low level as the frequency of the R.F. input signal returns to $f_0$. It is seen therefore that the frequency discriminating bridge 14 transforms the frequency modulation present on the original R.F. input signal to an amplitude modulation present on the R.F. output signal from the bridge giving the R.F. amplitude characteristics shown on FIG. 6. It is noted that the greater the frequency deviation of the R.F. input signal to the bridge, the greater will be the amplitude modulation of the R.F. output signal from the bridge.

In addition to the effect described above, the frequency discriminating bridge has one other effect upon the R.F. signal: the phase of the R.F. output signal from the bridge undergoes a 180° shift as the R.F. input signal passes through the resonant frequency of the bridge $f_0$. In other words the phase of the R.F. output signal during the time when the R.F. input signal is at a frequency higher than $f_0$ will be 180° different from the phase of the R.F. output signal when the frequency of the R.F. input signal is below the resonant frequency $f_0$. The frequency discriminating bridge is therefore seen to have converted the original frequency modulated R.F. input signal into an R.F. output signal which may be described as double-sideband-suppressed-carrier modulation, a type of modulation well understood by those skilled in the art.

A.M. modulation on the output of the microwave generator 11 is also passed through the bridge 14. However, in practical microwave generators the amount of A.M. modulation is normally small and in practice is much smaller than the A.M. modulation occurring at the output of bridge 14 after conversion of the original F.M. modulation to A.M. modulation. Consequently, in practice the original A.M. modulation present can be neglected from further consideration in signal branch 8.

The R.F. output of the frequency discriminating bridge 14 is fed to one input terminal of a balanced mixer 19 wherein it is heterodyned with a signal derived from a local oscillator 21 as of, for example, a klystron oscillator. The local oscillator frequency differs from the frequency of the R.F. generator 11 by a suitable I.F. frequency as of, for example, 30 megacycles. The output of the local oscillator 21 is applied to the balanced mixer 19 via a suitable transmission line and a variable attenuator 22, for adjusting the amplitude of the R.F. energy applied to the mixer 19.

The output of the balanced mixer 19 includes the spectrum as found in the output of the discriminating bridge 14 modified to the extent that the center frequency is transformed to the I.F. frequency as of, for example, 30 megacycles. The new I.F. spectrum is indicated at (*d*). The output of the balanced mixer 19 is fed to the input of an I.F. amplifier 23 and thence to a buffer I.F. amplifier 24. The output of the buffer I.F. amplifier 24 is fed to one terminal of a phase sensitive detector 25.

The reference branch 9 of the F.M. detector network 20 carries both the A.M. and F.M. R.F. components through a variable attenuator 26 to a variable phase shifter 27. The output of the variable phase shifter 27 is fed to the input of a balanced mixer 28 wherein the A.M. and F.M. components are heterodyned with the signal from the local oscillator 21 to produce both an A.M. and an F.M. spectrum having a center frequency transposed to the common I.F. frequency as of, for example, 30 megacycles. The F.M. and A.M. R.F. spectrums are then fed to the input of an I.F. amplifier 29 where they are amplified and a first portion of the output thereof fed to an A.M. detector 31 wherein the A.M. modulation and rectified carrier is separated from the F.M. components. The A.M. modulation superimposed on the rectified D.C. current of the carrier $f_0$ is fed through a series connected milliammeter 32 and resistor 33 to ground. The other portion of the I.F. amplifier 29 output is fed via buffer I.F. amplifier 34 to the other input terminal of the phase sensitive detector 25. The I.F. signal levels are adjusted so that the signal level applied to the phase sensitive detector 25 from reference branch 9 is greater, typically at least 10 db, than the signal level applied to the phase sensitive detector 25 from signal branch 8. When this is done the A.M. components present in reference branch 9 are effectively suppressed and do not appear in the output of the phase sensitive detector 25.

The phase sensitive detector 25 is a type of detecting mechanism well known to those skilled in the art. It is selected because it is extremely sensitive to signals at the I.F. frequency but is effective in suppressing in its output any signals not at the I.F. frequency. The output of the phase sensitive detector 25 is a voltage which is directly proportional to the amplitude of the I.F. signal in signal branch 8, which in turn is a direct function of the peak deviation $\Delta f$ of the R.F. signal from R.F. generator 11. Variable phase shifter 27 is adjusted to place the two I.F. inputs to the phase sensitive detector 25 in synchronism and thereby increase the sensitivity of the phase sensitive detector. When the two I.F. input signals in branches 8 and 9 are in phase, as applied to the phase sensitive detector 25, the output of the detector will have one sense, that is, the output of the detector will increase when the amplitude of the I.F. signal in signal branch 8 increases. When the phase of the I.F. input signals in signal branches 8 and 9 are 180° out of phase with each other the phase sensitive detector will have the opposite sense, that is, the output will decrease as the I.F. amplitude of signal branch 8 increases. It will be apparent to those skilled in the art therefore that the output of the phase sensitive detector 25 will be a voltage whose instantaneous amplitude is directly proportional to the instantaneous peak deviation $\Delta f$ of the original R.F. signal from R.F. generator 11.

For purposes of explanation of the mechanism involved a R.F. input signal has been assumed which had a discrete frequency modulation present at a modulating frequency $f_m$ and having a peak deviation $\Delta f$. However, the mechanism functions in the same fashion if the frequency present is random or a combination of random and discrete frequency modulations. For the example cited, however, the output of the phase sensitive detector would be a sine wave voltage having an amplitude proportional to the peak deviation $\Delta f$ and a frequency equal to the original modulating frequency $f_m$. The output A.C. signal of phase sensitive detector 25 is fed to the F.M. terminal 35 of a suitable 3 position switch 36.

Care is preferably exercised in designing the above described F.M. detecting network 20 especially regarding the phase shifts and electrical path lengths between the local oscillator 21 and the phase sensitive detector 25 through both the F.M. signal branch 8 and the reference branch 9. These two electrical path lengths should be substantially equal, and the phase characteristics through both branches made equal in order to obtain a canceling effect in the phase sensitive detector 25 for any local oscillator frequency modulation.

In a typical application, such as a C.W. radar system, the typical A.C. signals appearing in the output of the phase sensitive detector 25 do not consist of merely one single R.F. signal but instead consists of many closely spaced lines or hash corresponding to the F.M. noise of the R.F. generator 11.

The importance of being able to measure the F.M. noise sideband energy within narrow bands under consideration to predict C.W. Doppler radar performance can be seen by reference to FIG. 4 wherein there is shown the typical transmitter to receiver R.F. leakage signal of a C.W. Doppler radar. In the typical Doppler radar system there is a carrier of a certain frequency $f_o$ which is continuously transmitted. Echoes returning from targets which it is desired to analyze are received at the receiver shifted in frequency by an amount proportional to the relative velocity between the transmitter and receiver. The transmitted carrier signal is normally derived from some low power oscillator in the transmitter section such as, for example, a stabilized klystron oscillator. The typical frequency spectrum output of such an oscillator is as shown in FIG. 4. More specifically, there is the carrier frequency line with certain A.M. and F.M. noise sidebands. the F.M. noise level power being generally at least 60 db below the carrier level and the A.M. noise being 50 db below the F.M. noise level. The noise level is normally highest at frequencies close to the carrier and decreases at frequencies removed from the carrier.

In a typical C.W. radar installation, the amount of transmitter to receiver R.F. leakage can be diminished to approximately −120 dbm where dbm means decibels below a milliwatt. Receiver sensitivity is generally limited by the noise level and is generally unable to distinguish between F.M. and A.M. noise such that the receiver may operate down to sensitivity between −120 and −130 dbm depending upon how close into the carrier in frequency the Doppler shifted echo appears. Thus from a standpoint of predetermining radar systems performance it is extremely desirable to be able to accurately measure and precisely specify the purity of the transmitted carrier wave, i. e., the relative amplitude of the noise sidebands, and particularly the F.M. sideband noise thereon over the sideband of interest as of 1–300 kc. removed from the carrier.

F.M. noise, of course, will appear as energy at frequencies other than the carrier and can either be hash or discrete sidebands. In discussing F.M. noise it is common to refer to F.M. noise power in a given bandwidth being a certain number of db down from the unmodulated carrier. However, for the purposes of clearly specifying the noise level it will be more convenient to define the noise in a certain bandwidth in terms of effective or R.M.S. frequency deviation in the bandwidth of interest at a certain frequency region in the spectrum. In other words a noise power measured as "so many db below the carrier" at a certain place in the spectrum may be equated with an "equivalent" power which would be generated by a discrete modulation at the same place in the spectrum. Since noise power is typically very small, the "equivalent" power can usually be considered to be the power in only the first sideband of the "equivalent" modulation. For example, if the actual noise power was measured in a certain bandwidth removed from the carrier $f_o$ by a frequency $f_m$, it could be equated with the power which would be present if an intentional discrete modulation were present at the same modulating frequency $f_m$ and having the appropriate frequency deviation $\Delta f$. Under these circumstances it is quite customary to define an "equivalent" frequency deviation $\Delta f$, and this is sometimes termed the "R.M.S. frequency deviation."

These two F.M. noise measuring concepts are equated as follows: The amplitude of the F.M. R.F. voltages in the carrier and sidebands vary as Bessel functions of the modulation index. The voltage amplitude of the carrier will vary as $J_0(M_f)$, the amplitude of the first sideband will vary as $J_1(M_f)$, etc. Therefore the relative amplitude of the power in the carrier and the power in one of the first order sidebands will be:

$$\text{db}=20\times\log_{10}\frac{J_0(M_f)}{J_1(M_f)} \quad (3)$$

When the modulation index is small, that is, less than 0.5:

$$J_0(M_f)\cong 1.0 \quad (4)$$

and, $$J_1(M_f)\cong\frac{M_f}{1}\cong\frac{\Delta f}{2f_m} \quad (5)$$

and, $$J_2(M_f)\ \ldots\ J_n(M_f) \quad (6)$$

are negligibly small. Under these circumstances Equation 3 becomes, $$\text{db}=20\log_{10}\frac{2f_m}{\Delta f} \quad (7)$$

Equation 7 gives the desired correlating relationship between the power in one of the first order sidebands and the carrier power for small modulation indexes. It should be noted that the noise power, in db down from the carrier, varies only with peak frequency deviation ($\Delta f$) for a certain frequency $f_m$ removed from the carrier frequency $f_o$. Therefore the F.M. noise power at a certain frequency removed from the carrier frequency is equally well expressed in terms of frequency deviation $\Delta f$. For example, suppose the F.M. noise in a one kc. bandwidth centered at 10 kc. from the carrier was measured and found that the noise power was 100 db below the carrier power, substituting into Equation 7 we have:

$$100=20\times\log_{10}\frac{2(10{,}000)}{\Delta f}$$

Solving this equation we obtain $\Delta f$=0.2 cycle per second peak deviation or 0.14 c. p. s. "R.M.S. deviation."

The output signal of the phase sensitive detector 25 will be a voltage whose amplitude is a direct function of the instantaneous peak deviation of R.F. generator 11. In practice the output of most R.F. generators is frequency modulated in a random fashion and this is called F.M. noise. A measure of the instantaneous frequency deviation could be observed by connecting an oscilloscope to the output terminal 35 of the phase sensitive detector 25. However, in practice it is more desirable to perform a weighting or averaging operating, and determine the F.M. noise sideband energy at various Doppler frequencies of interest, $f_m$. When this is done plots of F.M. and A.M. noise level at various modulation frequencies $f_m$ can be prepared showing the characteristics of the R.F. generator 11 in a form similar to the graph shown in FIG. 4. The distribution of F.M. noise vs. modulation frequency F.M. can be determined by a wave analysis of the voltage present at the output of the phase sensitive detector on terminal 35. This wave analysis is performed by a wave analyzer 30 shown on FIG. 5.

Since the voltage appearing at the output of the phase sensitive detector 25 has an amplitude linearly proportional to the instantaneous peak frequency deviation of R.F. generator 11 this voltage could be either sinusoidal or random, or a combination of both. A sinusoidal voltage at a frequency $f_m$ would occur if the generator was frequency modulated at a modulating frequency $f_m$, while a random voltage would occur due to either a random frequency modulation or due to noise modulation. However, any random waveform can be theoretically resolved, by Fourier analysis, into an infinite series of discrete sinusoidal waveforms having mathematically-determinable amplitudes. If such a random waveform is a voltage, it is common practice to determine the amplitudes of the equivalent Fourier sinusoidal waveforms by measurement thereof using an instrument called a wave analyzer—a device well known to those skilled in the art. The output voltage from phase sensitive detector 25 is wave-analyzed in the subject equipment by wave analyzer 30. With this device the "R.M.S. deviations" can be determined for either a discrete or a random noise frequency modulation of R.F. generator 11.

The voltage signal found in the output of the phase sensitive detector 25 is fed via F.M. terminal 35 and switch 36 to the input of precision calibrating attenuator 37 and thence to a video amplifier 38 portion of the wave analyzer 30. The video amplifier 38 is designed to have a flat response over the desired noise bandwidth under measurement as of, for example 1.0 kc. to 150 kc. The output of the video amplifier 38 is fed to one input terminal of a balanced A.M. modulator 39. The function of the calibrated attenuator 37 will be more fully described below.

A variable frequency local oscillator 41, variable in frequency as of, for example, from 200 kc. to 350 kc. is coupled via a variable attenuator 42 and switch 43 to the other input terminal of the balanced A.M. modulator 39. The output of the balanced modulator 39 contains upper and lower F.M. sideband lines having a spectrum center frequency at the frequency $f_2$ of the variable frequency local oscillator 41. The entire spectrum ($f$) may be shifted in frequency by 150 kc., by tuning the local oscillator 41 over its 150 kc. tunable range. The output of the balanced modulator 39 is fed to the input of a 200 kc. center-frequency, one-kc.-bandpass, filter 44 as of, for example, of the mechanical or crystal type which selects from the spectrum a one kc. bandwidth which will be examined. Tuning the local oscillator 41 allows any desired 1 kc. band of the spectrum to be passed through the filter 44.

The output of the 1-kc.-bandpass filter 44 is fed to the input of a 200 kc. amplifier 45 wherein it is amplified to a suitable level. One portion of the output of the 200 kc. amplifier 45 is fed to the vertical deflection plates of an oscilloscope 46 via the intermediary of a switch 47. The other portion of the output of the 200 kc. amplifier 45 is fed to an R.M.S. voltmeter 48 wherein the R.M.S. volts contained within the selected 1 kc. band of the F.M. spectrum may be measured.

Voltmeter 48 serves as a relative measure of the amplitude in successive narrow bandwidths of the Fourier components of the phase sensitive voltage output under measurement. As previously pointed out, the amplitude of these voltages is directly proportional to the causing frequency deviation such that the voltmeter 48 serves to provide a relative measure of the "R.M.S. frequency deviation" and therefore a measure of the F.M. sideband power of the band under consideration.

Calibration of the voltmeter 48 is obtained as follows: The modulation electrode of the R.F. generator 11 under measurement has intentionally applied thereto an F.M. modulating signal of sufficient amplitude to produce a carrier null at a certain predetermined peak deviation as, for example, 50,000 cycles per second. Solving Equation 2 for $f_m$ it turns out that the modulating frequency $f_m$ should be 20.79 kc. and is supplied by sine wave oscillator 51. Calibrated attenuator 52 and variable attenuator 53 serve to control the amplitude of the applied modulating voltage $V_m$ at 20.79 kc. to produce the first carrier null condition. The carrier null condition is determined by spectrum analyzing a portion of the I.F. output of buffer amplifier 34 in the reference branch 9 of the F.M. detector. This portion of a spectrum analyzer 40 will be more fully described below.

By tuning the variable frequency local oscillator 41 to 220.79 kc., the intentionally produced F.M. sideband at 20.79 kc. will be passed through the 200 kc. center-frequency, 1-kc.-bandpass, filter 44 and fed to the voltmeter 48 where its voltage may be indicated. The calibrating attenuator 37 is then adjusted for a convenient reading on the voltmeter 48. For example, most of the attenuation of the calibrating attenuator 37 is added until a conveniently measurable amplitude reading is obtained on the voltmeter 48 as of, for example, 1 millivolt. The insertion setting of the calibrating attenuator 37 is then noted as of, for example, 100 db. This attenuator setting is the desired calibration setting, and gives the reference reading on voltmeter 48 corresponding to an intentional applied peak frequency deviation $\Delta f$ of 50,000 cycles per second.

A check on the F.M. noise calibration and on the linearity of the complete system can be had by increasing the attenuation of attenuator 52 by a certain amount as of 60 db and decreasing the attenuation of the calibrating attenuator 37 by the same amount and noting to see if the voltmeter 48 retains the same reading for the intentionally produced line.

The inventional modulating signal of 20.79 kc. is now removed from R.F. generator 11 and measurement of $f_m$ noise sideband level is accomplished as follows: The variable frequency local oscillator 41 is tuned to select the frequency $f_m$ where the desired sideband noise power or discrete deviation is to be measured. The calibrating attenuator 38 is then adjusted by removing attenuation until the voltmeter 48 registers the same 1 millivolt reference level. The new calibrating attenuator db insertion setting is then noted as of, for example, 40 db. Thus for example, as given, the F.M. noise level at the selected frequency is 60 db down from a peak deviation of 50,000 c.p.s. and therefore is 50 c.p.s. peak or 35.35 c.p.s. "R.M.S. frequency deviation" $\Delta f$. Utilizing the Equation 7 above and substituting in the peak deviation $\Delta f$, the noise power may be expressed in db down from the carrier at the modulated frequency $f_m$.

The spectrum analyzer 40 allows the entire F.M. and A.M. frequency spectrum to be observed for the carrier null determination. The spectrum including carrier signal is derived from the reference branch 9 of the F.M. detector network 20 and more specifically is sampled from the output of the buffer amplifier 34 and thence fed to one input terminal of an I.F. mixer 54. A swept local oscillator 55 at a frequency of the I.F. plus or minus 455 kc. is swept electrically in frequency over the frequency band of interest by a signal derived via a variable attenuator 57 from a sawtooth generator 56. The swept local oscillator signal is fed to the other input terminal of the I.F. mixer 54.

The output of mixer 54 will contain the carrier and upper and lower sidebands at a new I.F. center frequency of 455 kc. This spectrum is fed to a 455-kc. centered, 800 cycles per second bandpass, filter 58 which successively examines 800 cycle per second bandwidth segments of the combined A.M. and F.M. spectrums as the spectrum is swept in frequency past the filter frequency. The output of the filter 58 is fed to a 455 kc. amplifier 59 which serves to amplify the spectrum and feed it to one terminal 61 of switch 47. When the switch 47 is connected to terminal 61, the carrier and sideband components in the output of the R.F. generator 11 are imposed on the vertical deflection plates of the oscilloscope 46.

A reference portion of the output of the sawtooth generator 56 is fed via line 62 to the $x$ deflection plates of the oscilloscope 46 for displaying the upper and lower sideband and carrier components of the output of the R.F. generator 11. By observing the carrier amplitude on the oscilloscope 46 as the variable attenuator 53 is adjusted, the carrier null condition can be very precisely determined thereby intentionally superimposing upon the output of the R.F. generator 11, an F.M. sideband at a modulating frequency corresponding to 20.79 kc. with an amplitude corresponding to a peak deviation of 50,000 cycles per second.

The F.M. noise spectrum or discrete F.M. sidebands of the R.F. generator 11 may be observed by switching switch 43 from the variable frequency local oscillator 41 to a second swept local oscillator 65 which is swept via the sawtooth generator 56, the width of the sweep of the local oscillator 65 being determined by the amplitude of the applied sawtooth voltage which may be varied by a variable attenuator 66. The amplitude level of swept local oscillator signal is adjusted to be substantially equal to the level of the previously applied signal from the variable frequency oscillator 41 via variable attenuator 67 and the two levels may be equalized by obtaining equal readings on microammeter 68 connected across the input terminal to the balanced modulator 39.

By connecting the swept local oscillator 65 into the balanced A.M. modulator 39, as described above, the entire F.M. sideband spectrum may be displayed on the oscilloscope 46 as a function of the sweep voltage obtained from the sawtooth generator 56 as previously described. Moreover, selected smaller portions of the F.M. sidebands may be examined by properly adjusting the variable attenuator 66 to thereby decrease the width of the F.M. spectrum which is scanned. In addition, the center frequency of the swept local oscillator 65 may be adjusted via center frequency control 69 such that certain portions of the F.M. spectrum which is desired to observe may be selected as desired.

A.M. sideband components may be measured by switching switch 36 to the A.M. position 71 thereby connecting the audio component output of the A.M. detector 31 to the input of the video amplifier 38. Variable attenuator 26 in the reference arm of the F.M. detector 20 is then adjusted to give a certain reference amplitude as of, for example, 0.8 milliampere of D.C. current through the 5K resistor 33 in order to produce a four volt drop thereacross. Since the A.M. noise components are normally such a small fraction of the carrier amplitude substantially all of the four volt signal across resistor 33 will be due to the carrier. Therefore it can be said that when the variable attenuator 26 is adjusted for four volts across resistor 33 that the carrier amplitude is four volts. The A.M. sideband components may be then observed in the same manner as the F.M. sideband noise components were observed by the wave analyzer 30. Certain sideband noise or discrete A.M. components, which it is desired to measure, are then observed and the calibrating attenuator 37 setting observed for each particular measured frequency band to yield a certain constant reading on the voltmeter 48.

The A.M. noise signals are then calibrated by switching switch 36 to the A.M. calibrate position 72 thereby connecting the input of the video amplifier 38 to the sine wave output of a 10 kc. calibration oscillator 73 through the intermediary of a variable attenuator 74 and calibrating attenuator 37. The variable attenuator 74 is adjusted until the output applied to the calibrating attenuator 37 indicates 40 microvolts R.M.S. as measured across the input terminals to the calibrating attenuator 37 via microvoltmeter 75.

A 10 kc. calibrating line will appear and can be selected by the wave analyzer 30 for measurement by the voltmeter 48. The calibrating attenuator 37 is adjusted to obtain the same previous reading on the voltmeter 48 as obtained with the measured noise signals and then the calibrating attenuator 37 setting observed.

Since the calibrating 10 kc. signal has a level of 40 microvolts and since the carrier amplitude has previously been set to four volts the calibrating 10 kc. line thereby has an amplitude which is 100 db down from the carrier. Thus the relative amplitudes of the reference 10 kc. signal and the noise lines may be readily ascertained to thereby calibrate the noise with respect to the reference 10 kc. signal and thereby with respect to the carrier.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A method for measuring equivalent frequency deviation $\Delta f_n$ of the F.M. components in the output signal of an R.F. generator present either due to noise or discrete modulations including the steps of, frequency modulating the R.F. generator with a signal of a known reference frequency $f_m$, deriving a signal from the R.F. output of the R.F. generator which has an amplitude proportional to the frequency deviation of the modulated R.F. generator at certain selectable modulating frequencies, varying the amplitude $V_m$ of the modulating signal while monitoring the carrier amplitude of the R.F. generator, adjusting the amplitude $V_m$ of the modulating signal for the first carrier null condition whereby a certain uniquely determined frequency deviation $\Delta f_r$ is obtained at the known modulating frequency $f_m$, measuring the amplitude $V_r$ of the derived signal proportional to the impressed frequency deviation at the reference frequency $f_m$ for the first carrier null condition, measuring the amplitude $V_n$ of the derived signal proportional to the frequency deviation at the modulating frequencies to be measured, whereby the equivalent frequency deviation may be computed from measurements obtained.

2. Apparatus for measuring the equivalent frequency deviation of F.M. sideband noise components in the output signal of an R.F. generator comprising means for detecting the instantaneous frequency deviation of the output signal of the R.F. generator, means for deriving a signal from the detected instantaneous frequency deviation in variable accordance with the frequency deviation at a certain modulating frequency within a certain selectable relatively narrow frequency band which it is desired to measure, means for measuring the amplitude of the derived signal of the selectable frequency deviation component, and means for impressing a reference F.M. frequency deviation component on the output R.F. signal of the R.F. generator and having an amplitude corresponding to a known frequency deviation, such that by comparing the measured amplitudes of the reference frequency deviation signal and the frequency deviation signal of the selected noise components, the frequency deviation of the noise components and thus the relative amplitude of the R.F. carrier and the noise components is determined.

3. The apparatus according to claim 2 wherein said means for impressing a reference F.M. frequency deviation on the output signal of the R.F. generator comprises, a signal source of known frequency, and means for varying the amplitude of the signal derived from said signal source as applied to a modulating electrode of the R.F. generator whereby through adjustment of said amplitude varying means a first carrier null condition may be obtained to uniquely define the reference frequency deviation.

4. The apparatus according to claim 2 wherein said means for deriving a signal in variable accordance with the frequency deviation a certain selectable relatively narrow frequency band of the F.M. components comprises a wave analyzer.

5. The apparatus according to claim 2 wherein said means for measuring the amplitude of a selectable F.M. frequency deviation component includes a variable attenuator and a voltmeter.

6. Apparatus for measuring frequency deviation of an R.F. generator comprising, means for detecting the instantaneous frequency deviation of the R.F. generator, means for deriving a signal in variable accordance with the instantaneous frequency deviation of the modulated R.F. generator at certain selectable modulating frequencies which it is desired to measure, means for measuring the amplitude of the derived and selected frequency deviation signals at the selected modulating frequencies, and means for impressing a known reference frequency deviation on the output R.F. signal of the R.F. generator at a certain reference modulating frequency whereby the derived signal at the certain reference modulating frequency has an amplitude corresponding to a known frequency deviation, whereby a comparison of the measured amplitudes of the derived signal in accordance with the reference frequency deviation and the derived signal in accordance with an unknown frequency deviation at a selected modulating frequency will yield the frequency deviation of the F.M. modulation at the selected modulating frequency as the ratio of the amplitudes of the derived signals times the reference frequency deviation.

7. The apparatus according to claim 6 wherein said means for impressing a reference F.M. frequency deviation on the output signal of the R.F. generator comprises, a signal source of known frequency, and means for varying the amplitude of the signal derived from said signal source as applied to a frequency modulating electrode of the R.F. generator, whereby through adjustment of said amplitude varying means a first carrier null condition may be obtained to uniquely define the reference frequency deviation of the impressed reference frequency modulation.

8. The apparatus according to claim 6 wherein said means for deriving a signal in variable accordance with the frequency deviation of the modulated R.F. generator at certain selectable modulating frequencies comprises a wave analyzer.

9. The apparatus according to claim 6 wherein said means for measuring the amplitude of said derived and selected signal includes a variable attenuator and a voltmeter.

References Cited in the file of this patent

UNITED STATES PATENTS

| | | |
|---|---|---|
| 2,269,126 | Pieracci | Jan. 6, 1942 |
| 2,415,456 | Brumbaugh | Feb. 11, 1947 |
| 2,587,493 | Loughlin et al. | Feb. 26, 1952 |
| 2,790,143 | Kyhl | Apr. 23, 1957 |
| 2,803,802 | Magnuski | Aug. 20, 1957 |
| 2,883,616 | Sabaroff | Apr. 21, 1959 |

FOREIGN PATENTS

| | | |
|---|---|---|
| 629,545 | Great Britain | Sept. 22, 1949 |

OTHER REFERENCES

High Frequency Measurements, by August Hund, textbook published by McGraw-Hill Book Company, Incorporated, New York, second edition, copyright 1951.